United States Patent
Hoeck et al.

(10) Patent No.: US 8,739,915 B2
(45) Date of Patent: Jun. 3, 2014

(54) DRIVETRAIN AND METHOD FOR CONTROLLING A DRIVETRAIN

(75) Inventors: Michael Hoeck, Neunkirchen-Seelscheid (DE); Hans-Peter Nett, Adenau (DE); Michael Auweiler, St. Augustin (DE)

(73) Assignee: GETRAG Driveline Systems GmbH, Cologne (DE)

( * ) Notice: Subject to any disclaimer, the term of this patent is extended or adjusted under 35 U.S.C. 154(b) by 385 days.

(21) Appl. No.: 11/715,127

(22) Filed: Mar. 7, 2007

(65) Prior Publication Data

US 2008/0029328 A1 Feb. 7, 2008

Related U.S. Application Data

(63) Continuation of application No. PCT/EP2005/008933, filed on Aug. 18, 2005.

(30) Foreign Application Priority Data

Sep. 16, 2004 (DE) .................. 10 2004 046 008

(51) Int. Cl.
*B60K 17/344* (2006.01)
*B60K 23/08* (2006.01)

(52) U.S. Cl.
CPC .......... *B60K 23/0808* (2013.01); *B60K 17/344* (2013.01)
USPC ......................................... 180/248; 180/245

(58) Field of Classification Search
USPC ............................. 180/245, 248, 233; 701/69
See application file for complete search history.

(56) References Cited

U.S. PATENT DOCUMENTS

| 4,441,575 | A | * | 4/1984 | Suzuki | 180/248 |
| 4,493,387 | A | * | 1/1985 | Lake et al. | 180/248 |
| 4,750,382 | A | * | 6/1988 | Marc | 475/85 |
| 4,779,699 | A | * | 10/1988 | Hatano | 180/248 |
| 4,875,978 | A | * | 10/1989 | Hiketa | 180/248 |

(Continued)

FOREIGN PATENT DOCUMENTS

| DE | 36 35 406 C2 | 7/1989 |
| DE | 39 08 152 A1 | 10/1989 |

(Continued)

OTHER PUBLICATIONS

Application No. 2007-531625; Official Action dated Oct. 23, 2011.

(Continued)

*Primary Examiner* — Anne Marie Boehler
*Assistant Examiner* — Maurice Williams
(74) *Attorney, Agent, or Firm* — Knobbe Martens Olson & Bear, LLP

(57) ABSTRACT

A drivetrain for a motor vehicle, which has a permanently driven rear axle and a front axle which is driven on demand. The drivetrain comprises a drive unit whose output is connected to an input member of a differential of the rear axle and to a clutch arrangement for driving the front axle. The clutch arrangement has a first and a second friction clutch which can be controlled substantially independently of one another. The input members of said friction clutches are connected to the output of the drive unit. The output members of said friction clutches being connected respectively to a left and to a right driveshaft of the front axle.

19 Claims, 4 Drawing Sheets

(56) References Cited

U.S. PATENT DOCUMENTS

| | | | |
|---|---|---|---|
| 4,932,510 A * | 6/1990 | Takemura et al. | 192/60 |
| 4,973,296 A | 11/1990 | Shibahata | |
| 4,981,191 A * | 1/1991 | Shibahata | 280/245 |
| 5,058,700 A * | 10/1991 | Shibahata | 180/245 |
| 5,080,187 A * | 1/1992 | Asano et al. | 180/248 |
| 5,141,072 A * | 8/1992 | Shibahata | 180/245 |
| 5,267,914 A * | 12/1993 | Eastman et al. | 475/221 |
| 5,269,730 A * | 12/1993 | Hirota | 475/150 |
| 5,398,792 A * | 3/1995 | Teraoka | 192/48.2 |
| 5,417,298 A * | 5/1995 | Shibahata | 180/76 |
| 5,547,430 A * | 8/1996 | Gasch | 475/89 |
| 5,701,247 A * | 12/1997 | Sasaki | 701/1 |
| 5,904,634 A * | 5/1999 | Teraoka | 475/231 |
| 6,019,695 A * | 2/2000 | Kobayashi | 475/204 |
| 6,076,623 A * | 6/2000 | Teraoka et al. | 180/233 |
| 6,105,703 A * | 8/2000 | Kuroda et al. | 180/248 |
| 6,131,054 A * | 10/2000 | Shibahata | 701/1 |
| 6,135,229 A * | 10/2000 | Arimatsu | 180/248 |
| 6,360,153 B1 * | 3/2002 | Shinmura et al. | 701/48 |
| 6,378,677 B1 | 4/2002 | Kuroda et al. | |
| 6,638,195 B2 * | 10/2003 | Williams | 477/5 |
| 6,827,662 B2 * | 12/2004 | Nishiji | 475/221 |
| 6,857,985 B2 * | 2/2005 | Williams | 477/5 |
| 6,932,180 B2 * | 8/2005 | Matsuno et al. | 180/248 |
| 6,945,347 B2 * | 9/2005 | Matsuno | 180/242 |
| 7,062,984 B2 * | 6/2006 | Haka | 74/21 |
| 7,258,187 B2 * | 8/2007 | Bowen | 180/248 |
| 7,291,094 B2 * | 11/2007 | Heier et al. | 477/174 |
| 7,383,913 B1 * | 6/2008 | Tsukamoto et al. | 180/307 |
| 2002/0033293 A1 * | 3/2002 | Fukuda et al. | 180/250 |
| 2003/0051935 A1 * | 3/2003 | Mori et al. | 180/248 |
| 2003/0079928 A1 * | 5/2003 | Hasegawa | 180/248 |
| 2005/0096162 A1 * | 5/2005 | Friedmann | 474/8 |
| 2005/0230172 A1 * | 10/2005 | Hopper | 180/247 |
| 2006/0142119 A1 * | 6/2006 | Meixner | 477/176 |

FOREIGN PATENT DOCUMENTS

| | | |
|---|---|---|
| DE | 39 00 638 C2 | 6/1994 |
| DE | 3900638 C2 | 6/1994 |
| EP | 1 142 745 A1 | 10/2001 |
| JP | 2002200927 | 7/2002 |

OTHER PUBLICATIONS

Publication xDrive—Der neue Allradantrieb im BMW X3 and BMW X5 (with English abstract), Feb. 12, 2004.

International Preliminary Report on Patentability, Sep. 16, 2004, PCT/EP2005/008933.

* cited by examiner

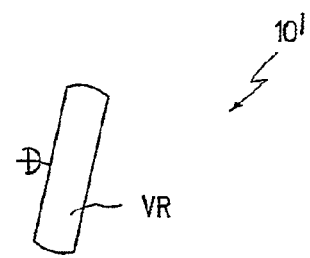
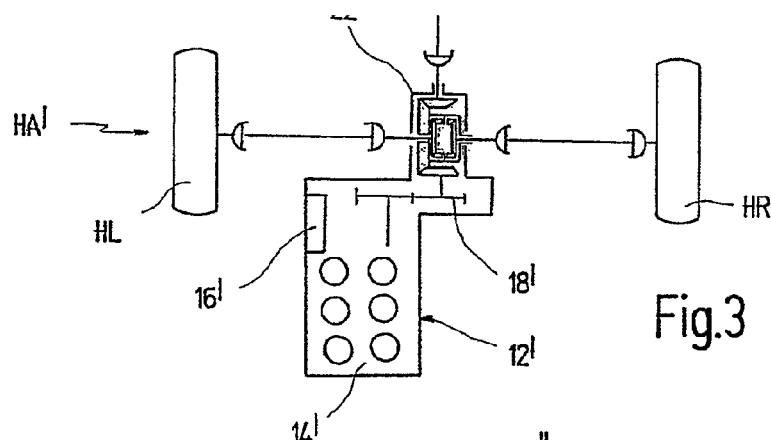
Fig.3
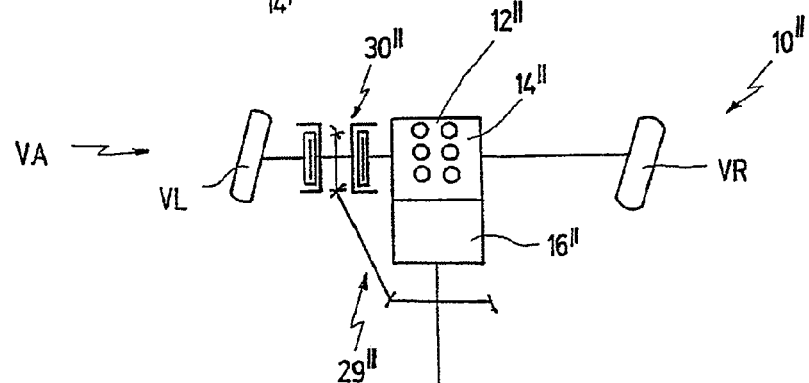
Fig.4
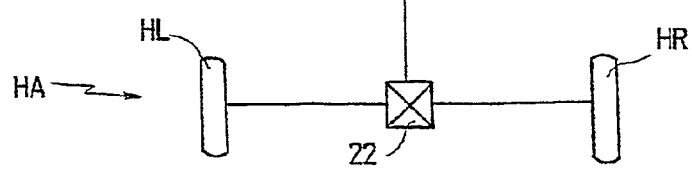

DRIVETRAIN AND METHOD FOR CONTROLLING A DRIVETRAIN

CROSS-REFERENCE TO RELATED APPLICATIONS

This application is a continuation application of international patent application PCT/EP 2005/008933 filed Aug. 18, 2005 and claims priority under 35 U.S.C. §119 from German patent application DE 10 2004 046 008.6 filed Sep. 16, 2004.

BACKGROUND OF THE INVENTION

1. Field of the Invention

The present invention relates to a drivetrain for a four-wheel drive motor vehicle, and to a method for controlling a drivetrain of said type.

In motor vehicles, four-wheel drive was originally used almost exclusively in off-road vehicles. In recent years, however, even vehicles designed predominantly for road-going use (such as for example passenger vehicles in the form of sedans, station wagons, SUVs) have frequently been equipped with four-wheel drive, specifically in order to increase driving safety, in particular when traction conditions are unfavorable.

In four-wheel drive vehicles, a distinction is generally made between differential-controlled systems and clutch-controlled systems. In differential-controlled systems, the drive torque from the drive unit is split between the front axle and the rear axle by means of a differential. In clutch-controlled systems, generally only one axle is driven, and the other axle is driven on demand. Here, in the simplest case, a hand-operated clutch can be provided, which is actuated from the passenger compartment. Modern four-wheel drive vehicles of said type, however, use automatically actuated clutches (for example Haldex clutches) which engage the second axle when a rotational speed difference between the axles builds up or has built up. Said systems are also referred to as "hang-on" systems.

As regards driving dynamics, the latter can be influenced in differential-controlled systems for example by means of a variable torque distribution. It is in this way possible to set up a generally oversteering or understeering driving behavior.

In differential-controlled systems, it is also known to lock the longitudinal differential by means of a clutch in the event of a lack of traction, so that torque is transmitted to the axle with the higher friction value.

In clutch-controlled systems, there are known systems with hang-on to the rear axle. These are generally front-wheel drive vehicles, with the rear axle being apportioned torque in the event of a lack of traction at the front axle. Conversely, systems are also known in which generally the rear axle is driven and the front axle is embodied as a hang-on axle.

In the present context, a drive unit is to be understood as a unit for providing drive torque. This can be a motor such as for example an internal combustion engine or an electric motor, either alone or in combination with a transmission.

The transmission can be a manual-shift multi-step transmission, an automatic converter assembly, a dual-clutch transmission, an automatic shift transmission, a continuously variable transmission, etc.

A drivetrain is known from U.S. Pat. No. 6,378,677, in which drivetrain the rear wheels can be controlled individually, that is to say independently of one another, by means of respective clutches. The clutches are embodied as electromagnetic clutches whose engagement is controlled according to the rotational speeds of the wheels. When both clutches are open, drive torque is conducted only to the front axle. When the rear axle clutches are actuated, there is a split of power between the left and the right wheels, thereby providing a differential function.

2. Description of the Related Art

A drivetrain for a four-wheel drive vehicle is known from DE 39 00 638 C2, in which drivetrain the front axle is permanently driven, connected to the output of a drive unit either via a longitudinal differential or directly. The drive unit is also connected (via the longitudinal differential or a hang-on clutch) to a differential of the rear axle. In addition, each rear wheel is assigned an individually-controlled friction clutch, which is arranged in parallel, in order to be able to control the rotational speeds of the rear wheels differently. It is thereby possible, for example when cornering, to improve the cornering behavior by virtue of the rear wheel at the outside of the corner being apportioned a higher torque than the wheel at the inside of the corner.

A similar concept for controlling two friction clutches of a rear-wheel drive motor vehicle is known from DE-C 36 35 406.

In addition, a drivetrain concept of said type is known under the "Honda SH-AWD" name.

In said system, the drive torque is distributed between the front axle and the rear axle in the ratio 30:70 to 70:30, specifically by means of a planetary differential. The torque apportioned to the rear axle is supplied to two independently controllable electromagnetic clutches which are connected to the left and to the right rear driveshafts. The torque apportioned to the rear axle can therefore be distributed to the rear wheels in the ratio 0:100 to 100:0.

It is also possible to increase the rotational speed of the rear wheels over that of the front wheels when cornering. Said drivetrain concept is intended to influence driving dynamics, in particular the yaw moment.

Now, it is however the case that, in corners, the mean radius of the front axle is generally larger than the mean radius of the rear axle. The front axle must therefore rotate faster than the rear axle when cornering. This is generally compensated by the longitudinal differential.

In the cases of conventional differential-controlled systems and conventional clutch-controlled ("hang-on") systems, it is only possible even with the longitudinal clutch locked to provide a rotational speed synchronization between the front and rear axles. If, therefore, in the case of conventional systems of said type, the hang-on clutch is actuated when cornering, then a twisting moment is built up by means of the underlying surface between the front axle and the rear axle. Said twisting moment is superposed on the drive torque and leads to a reduction in the drive torque at the front axle and to an increase in the drive torque at the rear axle. This generally generates understeering driving behavior.

In the SH-system from Honda as stated above, the rotational speed of the rear axle is increased when cornering.

In order to increase the rotational speed at the rear axle, a highly complex planetary differential is required in the rear axle gearing. Overall, the construction of the SH-AWD system is comparatively complex.

BRIEF SUMMARY OF THE INVENTION

It is the object of the present invention to specify an improved drivetrain for a four-wheel drive motor vehicle and an improved method for controlling a drivetrain of said type. The improvement should be provided in particular in the field of driving dynamics.

Said object is achieved by means of a drivetrain for a motor vehicle, which has a permanently driven rear axle and a front axle which is driven on demand, having a drive unit whose output is connected to an input member of a differential of the rear axle and to a clutch arrangement for driving the front axle, with the clutch arrangement having a first and a second friction clutch which can be controlled substantially independently of one another, with the input members of said friction clutches being connected to the output of the drive unit, and with the output members of said friction clutches being connected respectively to a left and to a right driveshaft of the front axle.

The above object is also achieved by means of a method for controlling a drivetrain of a motor vehicle, in particular a drivetrain of the above stated type, whose left and right front wheels are driven individually or independently of one another on demand, having the steps:

detecting when the vehicle is to travel around a corner, and influencing the yaw moment while cornering by individually supplying the front wheels with drive torque.

The drivetrain and the method for controlling a drivetrain of said type according to the present invention offer excellent driving dynamics.

If the front wheel at the outside of the corner is apportioned a higher torque when cornering, which is possible by individually or independently actuating the friction clutches, it is possible to generate a positive yaw moment in the direction of the corner. In this way, it is possible to avoid the understeering driving behavior which is generally present in conventional hang-on systems when the hang-on clutch is actuated. It is even possible to obtain sporty driving behavior in which the vehicle is so to speak pulled into the corner by the front wheels, in particular the front wheel at the outside of the corner.

As a result of the fact that primarily the rear axle is driven, it is possible to obtain good acceleration values on account of the dynamic axle load transfer.

Driving stability can also be positively influenced.

It is for example possible to prevent load-shift oversteer when cornering by actuating both friction clutches or by actuating in particular the friction clutch for the front wheel at the inside of the corner. In the overrun mode, the increased front axle load potential also has an effect (dynamic axle load transfer).

As a result of the independently acting friction clutches, it is possible on underlying surfaces with different friction values at the left and at the right (u-split) for the torque to be transmitted to the wheel with the higher friction value. This results in an improvement in traction.

It is possible to prevent twisting of the drivetrain when cornering, in particular when traveling slowly, for example when parking or in multi-story car parks. This therefore also results in improved efficiency and lower tire wear. Squealing noises are avoided.

It is also advantageous that a front axle differential gearing is not necessary for the front axle in the clutch arrangement and can be omitted.

It is particularly advantageous if the drive unit is arranged in the region of the front axle.

It is possible in this way to obtain a good overall weight distribution of the vehicle.

According to one preferred embodiment, the drive unit is arranged in the region of the front axle, transversely with respect to the longitudinal direction of the motor vehicle.

This leads to a good utilization of space.

It is alternatively possible for the drive unit to be arranged longitudinally in the region of the front axle.

As a result of said measure, the present invention can also be applied to vehicles which, in a basic version, are offered only with rear-wheel drive.

According to an embodiment which is preferable overall, the output of the drive unit is connected to a gearwheel which is connected to an intermediate shaft (preferably a hollow shaft) which is concentric with respect to the front axle.

Said embodiment is significant in particular where the drive unit is installed in a front transverse arrangement, and makes it possible for the location of the drive output to the rear axle and the location of input members of the friction clutches to be selected favorably in terms of construction at the front axle.

Here, it is particularly advantageous if the intermediate shaft drives a cardan shaft via an angular gearing, which cardan shaft is connected to the input member of the differential of the rear axle.

Here, it is particularly advantageous if a ring gear is fastened to the intermediate shaft, which ring gear drives the cardan shaft.

It is also advantageous overall if the intermediate shaft is connected to the input of the clutch arrangement, as already stated above.

According to an alternative embodiment, the drive unit is arranged in the region of the rear axle.

This configuration is significant in particular in sporty vehicles, as a classic rear-wheel drive or also as a mid-engine arrangement.

It is advantageous overall if the friction clutches are arranged concentrically with respect to the front axle.

This makes it possible for the friction clutches to be integrated into the front axle in a constructively simple manner.

It is also particularly preferable for the friction clutches to have a common input member.

Said embodiment also simplifies the overall construction.

It is particularly advantageous overall if a transmission ratio difference is set up between the rear and the front axle.

Here, it is particularly advantageous if said transmission ratio difference is set up to be permanent.

In said embodiment, it is assumed that a complete closure of one or of both of the friction clutches of the front axle is generally necessary only for very short timespans, within which the transmission ratio difference does not lead to considerable twisting between the front axle and the rear axle, for example on account of slip at the wheels.

In said concept, it is assumed that the vehicle is driven predominantly by means of the rear axle. The front axle or the individual wheels of the front axle are actually engaged only on demand.

As a result of the transmission ratio difference, it is then possible to exert a specified influence on the driving dynamics.

Here, it is particularly advantageous if the transmission ratio difference is in the range between 0.1 and 20%, in particular between 0.2 and 10%, and preferably between 0.5 and 3%, particularly preferably in the range between 1 and 2%.

This makes it possible on the one hand to still exert sufficient influence on the driving dynamics, and on the other hand to avoid excessive twisting when the friction clutches are completely closed.

Here, however, it is particularly preferable if the transmission ratio difference is selected such that the rotational speed of the front axle is higher than the rotational speed of the rear axle.

In said embodiment, it can particularly preferably be provided that, when cornering, the front wheel at the outside of the corner is driven at a higher rotational speed than the rear wheel at the outside of the corner. This makes it possible to avoid an understeering driving behavior. It can be provided that the vehicle is pulled into the corner by the front wheels. It is possible in particular to obtain a sporty driving behavior in this way.

In the method according to the invention, it is advantageous if the yaw moment is adjusted by closed-loop control to an intended yaw moment by individually supply the front wheels with drive torque.

Here, the intended yaw moment can for example be determined on the basis of sensors which are already provided, including the steering angle, the longitudinal and lateral acceleration and the vehicle speed. It is generally of course also conceivable to provide a separate yaw sensor.

Here, it is likewise self-evident that the intended yaw moment need not be a fixed value. The intended yaw moment can in fact be influenced by manual input, for example if a sportier driving manner or a more comfortable driving manner is desired.

According to a further preferred embodiment of the method according to the invention, a step of influencing the yaw moment by individually braking the wheels of the vehicle is carried out only when the intended yaw moment cannot be adjusted by closed-loop control to the intended yaw moment by individually supplying the front wheels with drive torque.

Individually braking the wheels of the vehicle is a technique which is generally known in the art under the term "ESP". Said closed-loop control method prevents in particular the vehicle breaking away sideways, even in situations which are critical in terms of lateral dynamics.

Since such ESP closed-loop control interventions generally have an adverse effect on driving dynamics, it is advantageous if, according to the present invention, it is firstly attempted to adjust to the intended yaw moment in a quasi active manner by supplying the driven wheels with the suitable drive torque. Only when this can no longer prevent instability of the vehicle is a switch made to the classic ESP closed-loop control regime.

A higher degree of safety is obtained overall in this way, and considerably fewer ESP interventions take place.

It is also particularly advantageous if the step of influencing the yaw moment while cornering by individually supplying the front wheels with drive torque encompasses driving at least one front wheel at a higher rotational speed than the rear wheel rotational speed.

It is possible by means of said measure, as already stated above, to obtain a particularly high degree of driving dynamics.

Accordingly, an all-wheel drive system is provided overall which makes it possible to optimize the torque at the front wheels according to the requirements for driving dynamics and traction.

The rear axle differential can be embodied as a conventional bevel-gear planetary differential, with the driveshafts of the rear axle being coupled in transmission terms. It is however also likewise possible to realize the rear axle differential by means of a clutch arrangement which has two individually controllable friction clutches for the left and for the right rear wheel.

The term "friction clutch" is in the present context to be understood in a broad sense. Said term can refer to dry friction clutches, but particularly preferably wet-running multiplate clutches. The term "friction clutch" is however also to encompass alternative clutch systems such as for example magnetic powder clutches.

It is also to be noted that the driving dynamics can be improved by means of the method according to the invention not only in the traction mode but also in the overrun mode. It is for example possible, in the event of a load shift from the traction mode to the overrun mode in a corner, to prevent a generally impending breakaway (oversteer) at a rear axle gearing by providing either the front wheel at the inside of the corner of both front wheels with torque, so that an understeer moment is built up which counteracts the oversteer.

The concept of setting up a transmission ratio difference between the rear axle and the front axle in such a way that the front axle generally has a higher rotational speed than the rear axle is also considered to be a separate invention in the present context.

It is finally to be noted that the connection between the output of the drive unit and the input members of the friction clutches is generally direct, that is to say without the interposition of a separating clutch. This is however only a preferred embodiment.

It is self-evident that the features stated above and the features yet to be explained in the following can be used not only in the respectively specified combination but also in other combinations or individually without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing:

FIG. 4 is a plan view of a further alternative embodiment of a drivetrain according to the invention;

DETAILED DESCRIPTION OF THE INVENTION

Figure 1:
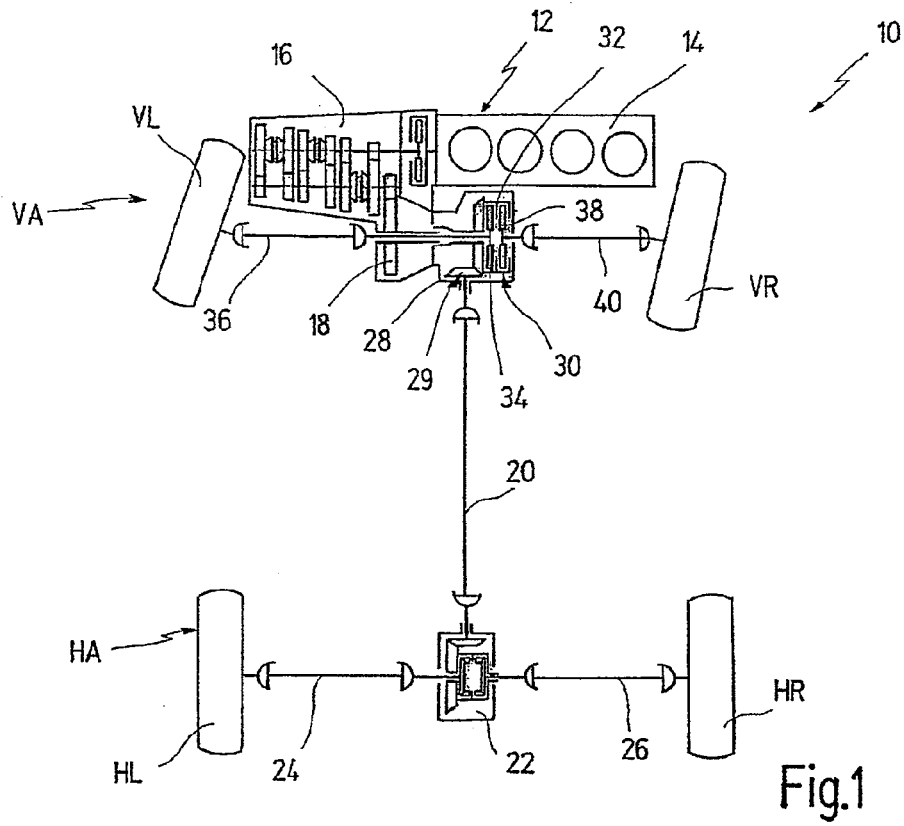
FIG. 1 shows a schematic plain view of a drivetrain for a motor vehicle according to a first embodiment of the present invention.

In FIG. 1, a first embodiment of the drivetrain according to the invention is denoted generally by 10.

The drivetrain 10 serves to drive a four-wheel drive motor vehicle, in particular a passenger vehicle having a front axle VA and a rear axle HA.

The wheels of the front axle VA are denoted by VL and VR. The wheels of the rear axle HA are denoted by HL and HR.

The motor vehicle is steered at the front axle VA.

The drivetrain 10 has a drive unit 12 which provides a drive torque.

More precisely, the drive unit 12 has a motor 14, in the present case an internal combustion engine, and a transmission 16, in the present case a multi-step transmission (for example a manual-shift transmission with a starting and separating clutch, an automatic shift transmission ASG or a dual-clutch transmission).

The drive unit 12 is installed transversely in the vehicle in the region of the front axle VA, more precisely in front of the front axle VA.

The drive unit 12 has an output 18 in the form of a "final drive". The output (final drive) 18 is formed by a gear set which has a gear on the drive output shaft of the transmission 16 and a gearwheel which is arranged concentrically with respect to the front axle VA.

The output 18 is, as will be explained below, coupled to a cardan shaft or drive output shaft 20. The cardan shaft 20 is coupled to a differential 22 for the rear axle (in the present case a bevel gear differential of the conventional type). The outputs of the rear axle differential 22 are connected to a left-hand driveshaft 24 of the rear axle HA and to a right-hand driveshaft 26 of the rear axle HA.

The drivetrain 10 is accordingly designed so as to permanently drive the rear axle HA.

A power take-off unit (PTU) 28 is provided in the region of the front axle VA, specifically coaxially with respect to the front axle VA.

The power take-off unit 28 has an angular gearing 29. A ring gear of the angular gearing 29 is arranged coaxially with respect to the front axle VA and is connected by means of a hollow shaft arrangement (not referred to in any more detail) to the output 18 of the drive unit 12. The ring gear of the angular gearing 29 is in engagement with a bevel gear 76 of the cardan shaft 20.

In addition, the hollow shaft arrangement is connected to a clutch arrangement 30 for the front axle VA.

The clutch arrangement 30 has an input member 32 which is rotationally fixedly connected to the hollow shaft arrangement or the ring gear of the angular gearing 29.

The clutch arrangement 30 has a first friction clutch 34 which connects the input member 32 to a left-hand driveshaft 36 of the front axle VA. The clutch arrangement 30 also has a second friction clutch 38 which connects the input member 32 to a right-hand driveshaft 40 of the front axle VA.

The front axle VA has no further coupling in transmission terms between the driveshafts 36, 40 of the front axle, in particular no conventional axle or transverse differential.

The friction clutches 34, 38 are each arranged concentrically with respect to the front axle VA. The friction clutches 34, 38 are arranged on the opposite side of the cardan shaft 20 from the output 18 of the drive unit 12.

The left-hand driveshaft 36 runs from an output member (not referred to in any more detail) of the first friction clutch 34, through the hollow shaft arrangement, to the left-hand front wheel VL.

In the illustrated drivetrain, the rear axle HA is permanently apportioned drive torque. If the friction clutches 34, 38 are opened, the motor vehicle is driven exclusively by means of the rear axle HA (except for any occurring drag torque).

The friction clutches 34, 48 are preferably embodied as wet-running multiplate clutches. The friction clutches 34, 38 can be controlled individually or independently of one another. Accordingly, drive torque can be transmitted to the two front wheels VL, VR or only to one of the front wheels VL, VR as well as to the rear axle depending on demand and the driving situation. The front wheels are accordingly engaged on demand according to the "hang-on principle".

In addition, a transmission ratio difference from 0.1 to 20%, preferably from 0.2 to 10%, and in particular from 0.5 to 3%, in the present case of 1.5%, is set up between the front axle VA and the rear axle HA. The transmission ratio difference is selected such that the front wheels VL, VR each have a higher rotational speed than the rear wheels HL, HR when the friction clutches 34, 38 are closed.

Figure 2:
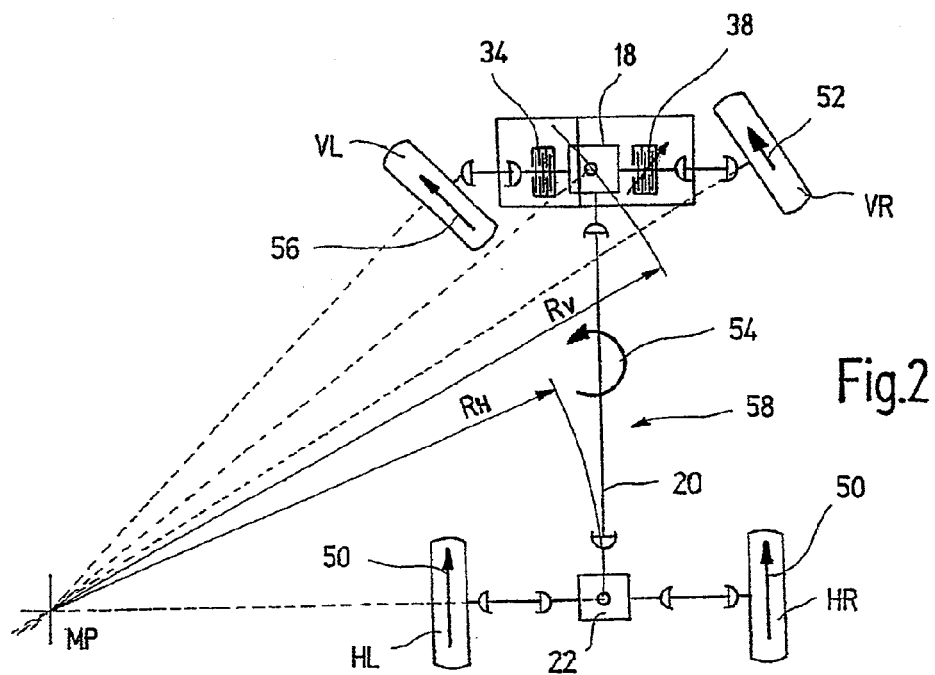
FIG. 2 is an illustration corresponding to FIG. 1 of a drivetrain according to the invention, with illustration of the driving-dynamic factors.

FIG. 2 shows how the drivetrain 10 can be utilized to positively influence the driving dynamics.

Here, FIG. 2 assumes a vehicle cornering to the left. The radius of the front axle is denoted here by RV. The radius of the rear axle is denoted by RH. The radius RV is naturally greater than the radius RH.

A drive torque 50 is exerted by the drive unit 12 on each of the rear wheels HL, HR via the cardan shaft 20 and the rear axle differential 22.

When cornering to the left, it is primarily the friction clutch 38 for the front wheel VR at the outside of the corner which is actuated, so that said front wheel VR receives a drive torque 52. Since the friction clutch 34 for the front wheel VL at the inside of the corner is not loaded or is loaded in any case less, the front wheel at the inside of the corner is apportioned less drive torque or even no drive torque.

It can be provided in this way that the vehicle is so to speak pulled into the corner by means of the front wheel VR at the outside of the corner.

Said effect is further increased in that the rotational speed of the front axle VA is higher than the rotational speed of the rear axle HA. It is also possible in this way to at least partially compensate the larger radius of the front wheel VR at the outside of the corner in comparison with the radii of the rear wheels HL, HR. In the extreme case, the larger radius can even be overcompensated. This is substantially dependent on the selected corner radius. The above selected value of 1.5% for the transmission ratio difference is for example selected such that, for narrow corners, an oversteering driving behavior is set up, and for wider corners with a larger corner radius, a slightly understeering behavior is set up in order to make the vehicle stable in particular at relatively high speeds.

Typical transmission ratio differences for obtaining driving behavior of said type are in the range between 0.1 and 20%, in particular between 0.2 and 10%, and preferably between 0.5 and 3%, particularly preferably in the range between 1 and 2%. Precise specifications however vary from vehicle to vehicle. The higher the load to which the friction clutches can be subjected, the higher the difference which can be selected.

The drivetrain according to the invention makes it possible to obtain the following advantages:

A significant improvement in driving dynamics is obtained. As a result of the front wheel VR at the outside of the corner being acted on with drive torque 52, as shown in FIG. 2, it is possible to generate a positive or oversteering yaw moment 54 in the direction of the corner.

If, in contrast, also the front wheel VL at the inside of the corner or only the front wheel VL at the inside of the corner is acted on with drive torque 56 (illustrated with dashed lines in FIG. 2), it is also possible to generate a negative yaw moment or understanding yaw moment 58.

By applying a positive yaw moment 54 when cornering, an understeering driving behavior can be avoided. A sporty driving behavior is obtained. This results in a higher level of safety and fewer ESP closed-loop control interventions.

In addition, in the limit region, any possible instability at the rear axle caused by a loss of side force as a result of excessive power is avoided in that, when a loss of side force occurs, the front axle is acted on with torque. This prevents oversteering behavior. This also increases safety, and the number of ESP closed-loop control interventions can be reduced.

When cornering, load-shift oversteer can be prevented by actuating both clutches or only the clutch of the inner front wheel. Here, in the overrun mode, the relatively high front axle load potential has a favorable effect (on account of dynamic axle load transfer).

A further advantage is the fact that the rear axle is driven in normal operation. In thus way, it is primarily the driven axle which is loaded during acceleration, specifically as a result of the dynamic axle load transfer.

As a result of the independently-acting friction clutches 34, 38, it is possible for the torque to be transmitted to the wheel with the higher friction value, in particular in a μ-split situation. This results in an improvement in traction.

Twisting of the drivetrain when cornering (for example when parking or in multi-story car parks) is also reduced. This results in improved efficiency and lower tire wear. Squealing noises can also be reduced.

As a result of the conventional front axle differential (for example bevel gear differential) being dispensed with, it is possible to provide a cost-effective, driving-dynamic four-wheel drive system which can positively influence the yaw moment.

Figure 3:
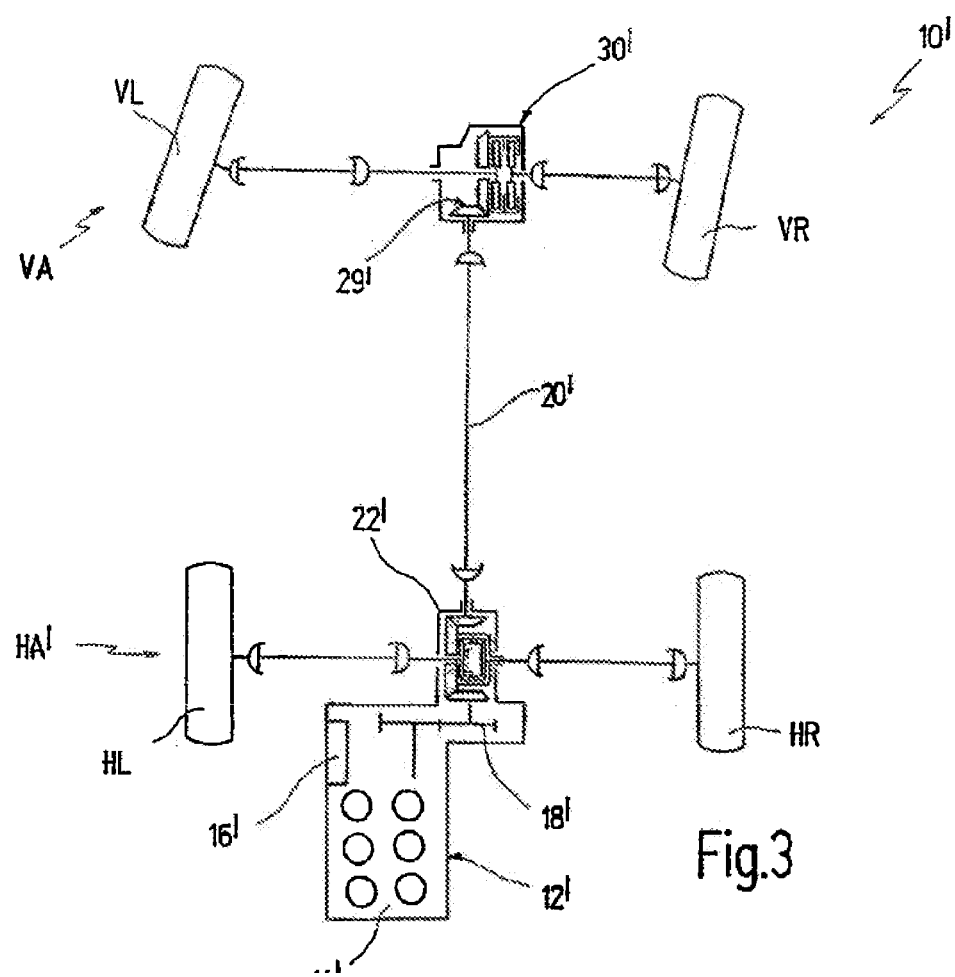
FIG. 3 is a plan view of an alternative embodiment of a drivetrain for a motor vehicle.

In FIG. 3, an alternative drivetrain 10 according to the present invention is denoted generally by 10'.

The drivetrain 10' differs from the drivetrain 10 of FIG. 1 in that the drive unit 12' is arranged in the region of the rear axle. The mode of operation is otherwise identical, however, the rear axle HA is permanently driven, and the front axle VA is driven by means of a clutch arrangement 30' with individually controllable friction clutches.

FIG. 4 shows a further alternative embodiment of a drivetrain 10" according to the invention.

In said embodiment, the drive unit 12" is likewise arranged in the region of the front axle VA, though this time in a longitudinal arrangement, so that the transmission 16" is arranged behind the engine 14".

The output of the transmission 16" is connected directly to the cardan shaft 20". The drive output to the front axle can for example be provided by means of a gearwheel which is driven by the cardan shaft 20" and is connected by means of a shaft (for example also an inclined shaft) to a further gearwheel on the front axle VA.

Here, the front axle VA can run beneath the drive unit 12" or else run through the drive unit 12".

The general design and the mode of operation is otherwise identical to the drivetrain 10 of FIG. 1.

Figure 5:
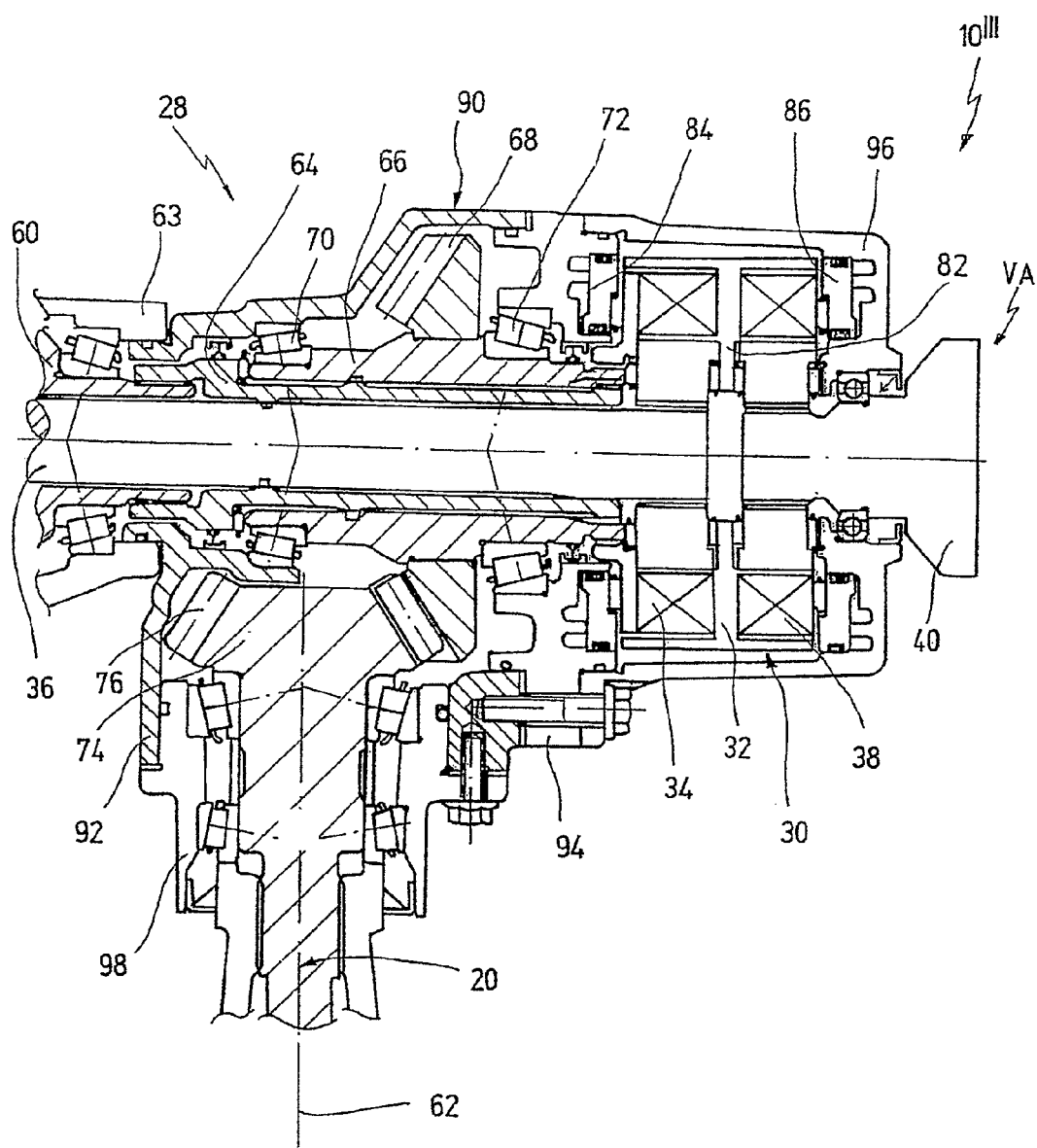
FIG. 5 shows a schematic sectioned view of a section of a front axle of a drivetrain according to the invention, corresponding to the embodiment of FIG. 1.

FIG. 5 shows an exemplary construction of the front axle VA of a further drivetrain 10''' according to the invention.

The construction illustrated in FIG. 5 can, for example, be implemented in the drivetrain 10 of FIG. 1.

Here, the power take-off unit 28 has a first hollow shaft section 60 which is rotationally fixedly connected to a gearwheel (not illustrated in FIG. 5) of the final drive output 18 of the transmission 16.

The first hollow shaft section 60 and the drive gearwheel which is connected rotationally fixedly thereto are situated here, in relation to a cardan longitudinal axis 62, on one side, for example on the left-hand side of the motor vehicle (as viewed in the direction of travel). The first hollow shaft section 60 can, as illustrated, still be arranged here within a housing 63 of the transmission 16.

The power take-off unit 28 is provided coaxially with respect to the front axle VA. A second hollow shaft section 64 is rotatably mounted in said power take-off unit 28, which second hollow shaft section 64 is rotationally fixedly connected to the first hollow shaft section 60. The hollow shaft sections 60, 64 surround the left-hand driveshaft 36 of the front axle VA.

A support sleeve 66 is fixed to the second hollow shaft section 64. A ring gear 68, which serves to drive the cardan shaft 20, is fixed to the support sleeve 66.

The support sleeve 66 is mounted by means of a first bearing 70 and a second bearing 72 which are in an X-arrangement.

Also shown in FIG. 5 is a cardan shaft stub 74, at the front end of which is formed a bevel gear 76 which is in engagement with the ring gear 68. Said engagement can be a hypoid toothing engagement.

The cardan shaft stub 74 which is aligned with the cardan longitudinal axis 62 is likewise mounted by means of two bearings which are in an O-arrangement.

The second hollow shaft section 64 extends beyond the ring gear 68 to the right-hand side and is connected by means of the support sleeve 66 to a common input member 32 of the clutch arrangement 30.

The input member 32 has a T-shaped web 82, to the left-hand side of which is arranged the friction clutch 34 and to the right-hand side of which is arranged the friction clutch 38.

Provided on the opposite sides of the friction clutches 34, 38 in each case are one first hydraulic actuator 84 for actuating the first friction clutch 34 and one second hydraulic actuator 86 for actuating the second friction clutch 38.

The output member of the first friction clutch 34 is connected to the left-hand driveshaft 36. The output member of the second friction clutch 38 is connected to the right-hand driveshaft 40.

The power take-off unit 28 has a housing 90, with a core housing 92 which is flange-mounted in the lateral direction on the transmission housing 63. An intermediate housing 94, in which the first hydraulic actuator 84 is held, adjoins the core housing 92 to the right in the direction of the front axle VA. Said intermediate housing 94 is adjoined by a housing cover 96 in which the second hydraulic actuator 86 is held.

The right-hand driveshaft 40 extends out of the housing cover 96 and is mounted therein by means of a bearing.

The left-hand driveshaft 36 extends through the hollow shaft sections 60, 64 and extends into the transmission housing 63, extending out of the latter to the left-hand side (compare FIG. 1).

The core housing 92 is adjoined in the direction of the rear axle by a cardan shaft housing 98 in which the cardan shaft stub 74 is rotatably mounted.

The first bearing 70 for mounting the support sleeve 66 is supported in the core housing 92. The second bearing 72 for mounting the support sleeve 66 is fixed in the intermediate housing 94.

It is self-evident that the friction clutches 34, 38 can be controlled in a closed-loop fashion by means of the hydraulic actuators 84, 86.

The closed-loop control can be implemented using existing sensors in the vehicle, for example wheel rotational speed sensors for ABS/ESP, acceleration sensors, vehicle speed sensors etc.

The closed-loop control has the aim of detecting the intended behavior of the vehicle, determining the actual driving behavior of the vehicle in terms of longitudinal and transverse dynamics, and automatically influencing the actual driving behavior of the vehicle in the event of a closed-loop control deviation.

If wheel slip is detected at the primarily driven rear axle HA, then traction and driving stability can be increased by actuating one or both friction clutches 34, 38.

If, for example, "understeering" is detected when accelerating round a corner, the clutch at the front wheel VL, VR at the outside of the corner in each case is actuated in order to build up additional torque at said wheel. This counteracts the understeering driving behavior.

If oversteering is detected for example when cornering, then a corresponding yaw moment which counteracts the oversteer can be generated by actuating, in a targeted fashion, the clutch of the front wheel at the inside of the corner, or both friction clutches.

A wheel drive is thus provided overall which makes it possible to optimize the torque at the front wheels according to the requirements for driving dynamics and traction.

Figure 6:
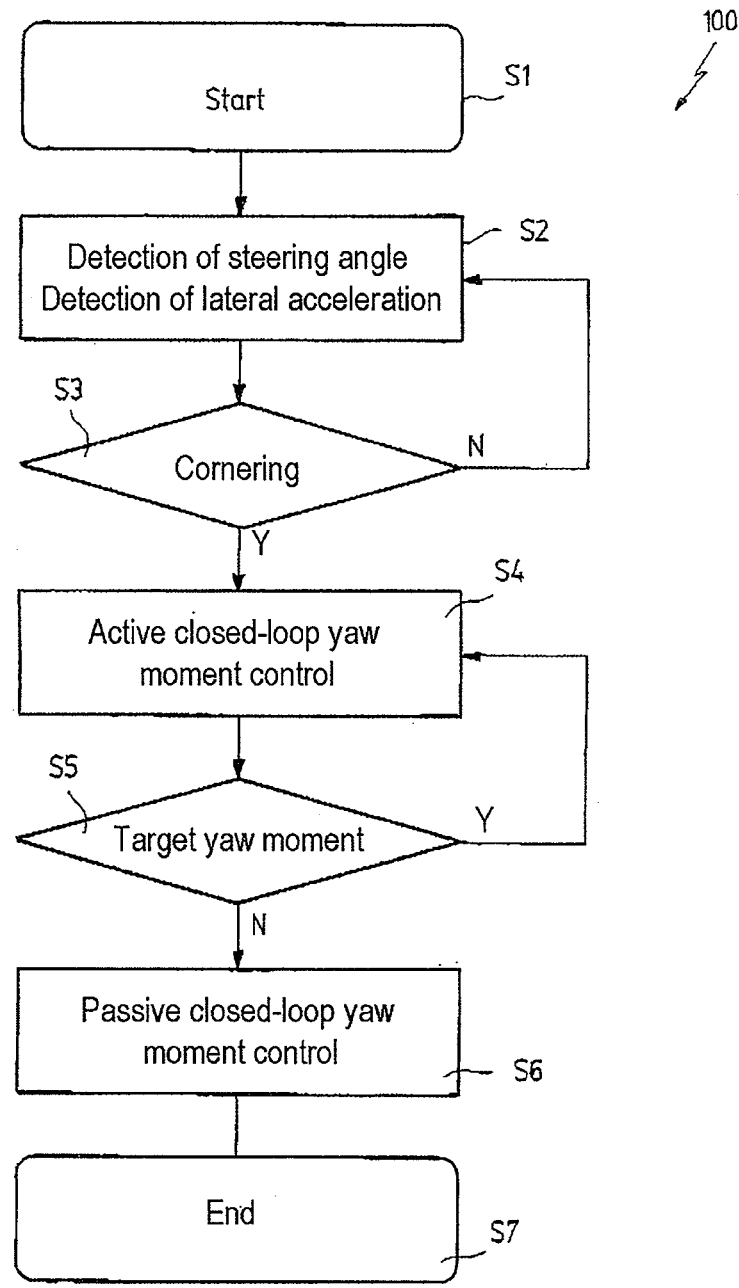
FIG. 6 shows a flow diagram of an embodiment of the method according to the invention for controlling a drivetrain.

In FIG. 6, a preferred embodiment of the method according to the invention for controlling a drivetrain is denoted generally by 100.

The method 100 according to the invention has, after a starting step S1, a step S2 in which, for example, a steering angle and a lateral acceleration and if appropriate a yaw angle and/or a yaw rate are detected in order to detect an intended state of the driving dynamics and an actual state of the driving dynamics.

It is subsequently queried in a step S3 as to whether the vehicle is cornering. If this is the case, then active closed-loop yaw moment control takes place in step S4, specifically by influencing the friction clutches 34, 38 of the clutch arrangement 30 in a targeted fashion as described above.

In step S5, it is queried as to whether the target or intended yaw moment can be obtained. If this is the case, then the active closed-loop yaw moment control in step S4 is continued in order to thereby actively adjust to the intended yaw moment.

If it is detected by determining the actual state of the driving dynamics that the target yaw moment cannot be obtained by means of active closed-loop yaw moment control (N in step S5), then passive closed-loop yaw moment control is carried out in step S6, whereby individual wheels of the vehicle are braked in a targeted fashion by means of the conventional ESP closed-loop control system in order to stabilize the vehicle.

What is claimed is:

1. A drivetrain for a motor vehicle, which has a permanently driven rear axle and a front axle which is driven on demand, having a drive unit whose output is connected to an input member of a differential of the rear axle and to a clutch arrangement for driving the front axle, with the clutch arrangement having a first and a second friction clutch which can be controlled substantially independently of one another, with the input members of said friction clutches being connected to the output of the drive unit, and with the output members of said friction clutches being connected respectively to a left and to a right driveshaft of the front axle, wherein the friction clutches directly connect the respective input members of the left and right driveshafts of the front axle, wherein the output of the drive unit is connected to a gear wheel which is connected to an intermediate shaft which is concentric with respect to the front axle, and wherein the intermediate shaft drives a cardan shaft via angular gearing, which cardan shaft is connected to the input member of the differential of the rear axle, wherein a transmission ratio difference is set up between the rear and the front axle such that, when the first and second friction clutches are fully closed, the front axle is driven with a higher rotational speed than the rear axle, wherein said transmission ratio difference is set up to be permanent, and wherein the first and second friction clutches are independently controlled.

2. The drivetrain as claimed in claim 1, wherein the drive unit is arranged in the region of the front axle.

3. The drivetrain as claimed in claim 2, wherein the drive unit is arranged in the region of the front axle, transversely with respect to the longitudinal direction of the motor vehicle.

4. The drivetrain as claimed in claim 1, wherein a ring gear is fastened to the intermediate shaft, which ring gear drives the cardan shaft.

5. The drivetrain as claimed in claim 1, wherein the intermediate shaft is connected to the input of the clutch arrangement.

6. The drivetrain as claimed in claim 1, wherein the friction clutches are arranged concentrically with respect to the front axle.

7. The drivetrain as claimed in claim 1, wherein the friction clutches have a common input member.

8. The drivetrain as claimed in claim 1, wherein the transmission ratio difference is in the range between 0.1 and 20%.

9. The drivetrain as claimed in claim 8, wherein the transmission ratio difference is in the range between 0.5 and 3%.

10. The drivetrain as claimed in claim 1, wherein the transmission ratio difference is selected such that the rotational speed of the front axle is higher than the rotational speed of the rear axle.

11. A drivetrain for a motor vehicle, which has a permanently driven rear axle and a front axle which is driven on demand, having a drive unit whose output is connected to an input member of a differential of the rear axle and to a clutch arrangement for driving the front axle, with the clutch arrangement having a first and a second friction clutch which can be controlled substantially independently of one another, with the input members of said friction clutches being connected to the output of the drive unit, and with the output members of said friction clutches being connected respectively to a left and to a right driveshaft of the front axle, wherein a transmission ratio difference is set up between the rear and the front axle, and wherein the transmission ratio difference is selected such that the rotational speed of the front axle is higher than the rotational speed of the rear axle, such that when the independently-controlled first and second friction clutches are fully closed the front axle is driven with a higher rotational speed than the rear axle, wherein said transmission ratio difference is set up to be permanent, and wherein a positive yaw moment is able to be generated in the direction of a corner by individually or independently actuating the first and second friction clutches.

12. The drivetrain as claimed in claim 11, wherein the friction clutches are arranged concentrically with respect to the front axle.

13. The drivetrain as claimed in claim 11, wherein the friction clutches have a common input member.

14. The drivetrain as claimed in claim 11, wherein the transmission ratio difference is in the range between 0.1 and 20%.

15. The drivetrain as claimed in claim 11, wherein the transmission ratio difference is in the range between 0.5 and 3%.

16. A drivetrain for a motor vehicle, which has a permanently driven rear axle and a front axle which is driven on demand, having a drive unit whose output is connected to an input member of a differential of the rear axle and to a clutch arrangement for driving the front axle, wherein a transmission ratio difference is set up between the rear and the front axle such that, when the clutch arrangement is fully closed, the front axle is driven with a higher rotational speed than the rear axle, wherein said transmission ratio difference is set up to be permanent, and wherein left and right front wheels of the front axle are driven substantially independently of one another on demand so as to influence the yaw moment while cornering.

17. The drivetrain as claimed in claim 16, wherein the transmission ratio difference is in the range between 0.1 and 20%.

18. The drivetrain as claimed in claim 16, wherein the transmission ratio difference is in the range between 0.5 and 3%.

19. The drivetrain as claimed in claim 16, wherein the transmission ratio difference is selected such that the rotational speed of the front axle is higher than the rotational speed of the rear axle.

* * * * *

UNITED STATES PATENT AND TRADEMARK OFFICE
CERTIFICATE OF CORRECTION

| | | |
|---|---|---|
| PATENT NO. | : 8,739,915 B2 | |
| APPLICATION NO. | : 11/715127 | |
| DATED | : June 3, 2014 | |
| INVENTOR(S) | : Hoeck et al. | |

It is certified that error appears in the above-identified patent and that said Letters Patent is hereby corrected as shown below:

In the Drawings

Replace Drawing Sheet 2 of 4 (Fig. 3) with the attached sheet.

In the Specification

Column 2 lines 47-48, Change "concerning, to --cornering,--.

Column 3 line 47, Change "(u-split)" to --(µ-split)--.

Column 5 line 9, Change "supply" to --supplying--.

Column 6 line 8, Change "of" to --or--.

Column 8 line 51, Change "understanding" to --understeering--.

Column 9 line 2, Change "thus" to --this--.

Signed and Sealed this
Twenty-sixth Day of January, 2016

Michelle K. Lee
*Director of the United States Patent and Trademark Office*